United States Patent
Gugin

[11] 3,783,951
[45] Jan. 8, 1974

[54] HARROW ASSEMBLY WITH ROCK FRAME TUBES

[76] Inventor: Robert J. Gugin, P.O. Box 926, Minnedosa, Manitoba, Canada

[22] Filed: Feb. 22, 1972

[21] Appl. No.: 228,280

[52] U.S. Cl. .................. 172/311, 172/413, 172/478, 172/491, 172/503, 280/413
[51] Int. Cl. ............................................. A01b 49/00
[58] Field of Search ..................... 56/228; 172/311, 172/400, 401, 456, 488–489, 501, 619, 620, 634, 635–636, 643, 413, 478, 491, 503; 280/411, 413

[56] References Cited
UNITED STATES PATENTS

| | | | |
|---|---|---|---|
| 2,467,616 | 4/1949 | French | 172/491 X |
| 3,568,777 | 3/1971 | Hook | 172/491 |
| 3,727,698 | 4/1973 | Selus | 172/491 |
| 228,054 | 5/1880 | Gale | 172/489 X |
| 659,576 | 10/1900 | Carter | 172/310 |
| 2,679,793 | 5/1954 | Rolf et al. | 172/489 X |
| 3,460,631 | 8/1969 | Friesen et al. | 172/311 |

Primary Examiner—Robert E. Pulfrey
Assistant Examiner—Eugene H. Eickholt
Attorney—Stanley G. Ade

[57] ABSTRACT

A flange or pocket is offstanding on one end of the rock tube of the wing sections of a harrow and is engageable by an offstanding crank on the corresponding end of the rock tube of the center section so that rotation of the center section rock tube also rotates the rock tubes of the wing sections. An adjustment is provided and of importance is the fact that the connection between the flanges or pockets and the cranks is free and not fixed thus allowing upward hinging and flexibility of the wing sections relative to the center section.

1 Claim, 4 Drawing Figures

PATENTED JAN 8 1974
3,783,951
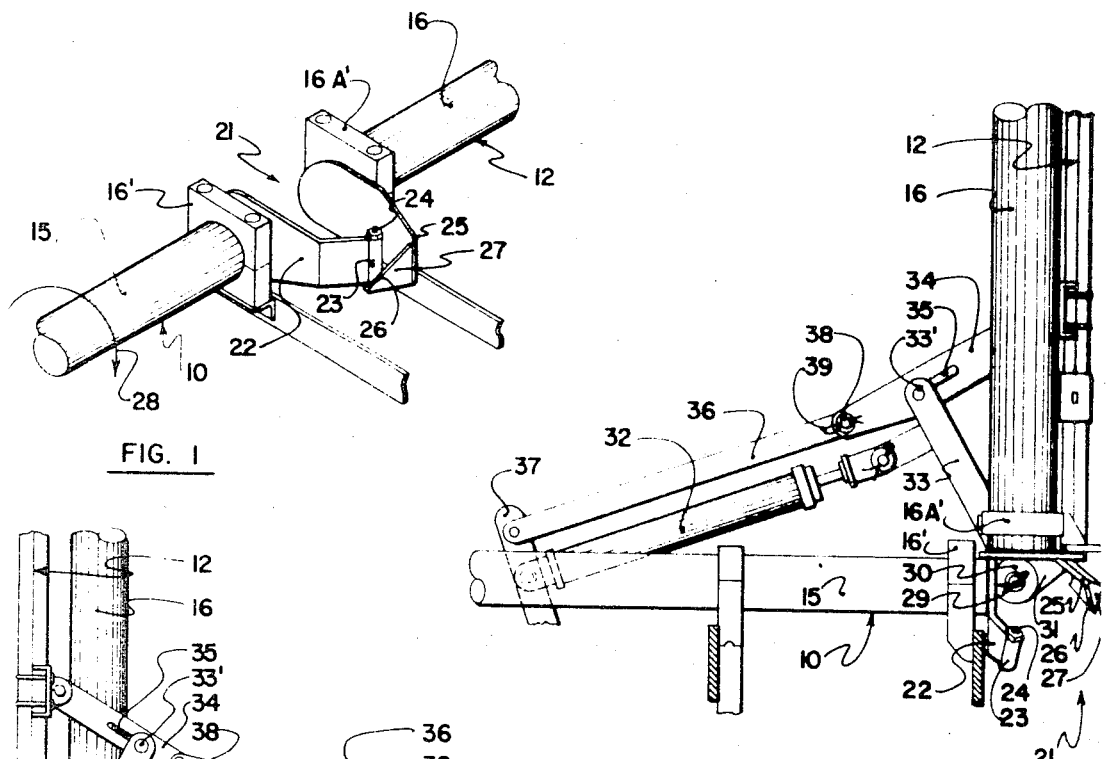
FIG. 1
FIG. 2
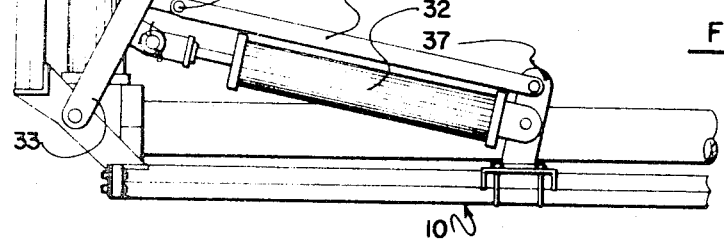
FIG. 3
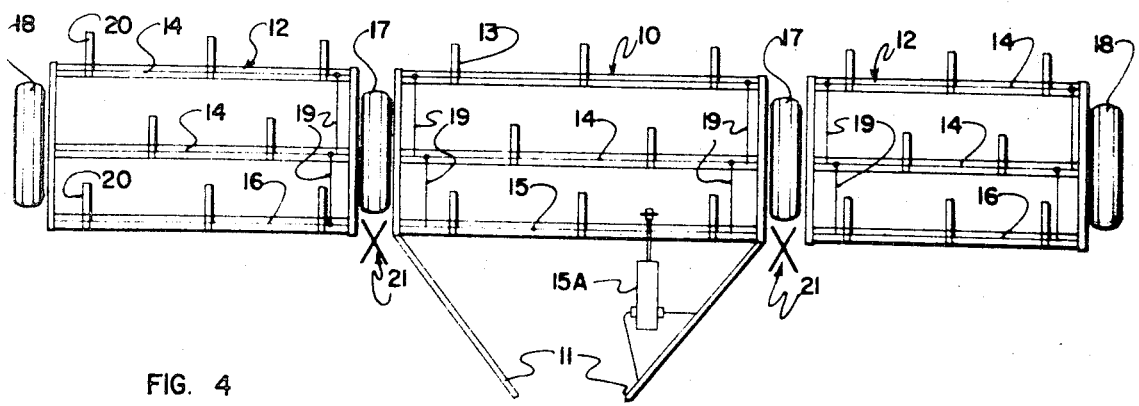
FIG. 4

HARROW ASSEMBLY WITH ROCK FRAME TUBES

BACKGROUND OF THE INVENTION

A harrow assembly includes a center section and a pair of wing sections, one upon each end and hinged thereto so that they can be folded upwardly for transport purposes. Such harrows include rock tubes which are normally rotatable through approximately 90° prior to folding in order to lift the harrow sections clear of the ground. Some difficulty is encountered in transferring the rotation of the center section rock tube to the wing section rock tubes yet still preserve flexibility between the sections and permit the upwardly hinging movement. Universal joints can of course be connected but this is not only expensive but limits the folding action of the wing sections relative to the center section.

SUMMARY OF THE INVENTION

The invention relates to a method of connecting the wing frame rock tubes to the center frame rock tube so that when the center frame rock tube is rotated to raise or lower the cultivators, this motion is transmitted to the wing frame rock tubes so that the cultivating elements on the wing frames can be raised and lowered concurrently with and by the same amount as the cultivating elements of the center section.

Another object of the invention is to form this connection between the center frame rock tube and the wing frame rock tubes in such a way that the wing frame rock tubes can be moved upwardly at right angles with the wing frames when the latter are folded upwardly for transportation purposes.

With the considerations and in entive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Figures in which:

FIG. 1 is a fragmentary isometric view showing the connection between the center frame rock tube and the wing frame rock tube.

FIG. 2 is a fragmentary elevation showing a portion of the wing frame situated in the uppermost or folded position.

FIG. 3 is a view substantially at right angles to FIG. 2.

FIG. 4 is a plan schematic view of a cultivator showing the location of the invention.

In the drawings like characters of reference indicate corresponding parts in the different figures.

DETAILED DESCRIPTION

Proceeding to describe my invention in detail, reference should first be made to FIG. 4 in which 10 illustrates generally a substantially rectangular center section or center frame having a draft assembly 11 connected thereto by which means the device may be connected to a source of power such as a tractor (not illustrated) in the conventional way.

A pair of wing frames collectively designated 12 are situated one upon each side of the center frame 10 and all three of the frames 10 and 12 are provided with cultivating elements 13 mounted upon subsidiary element tubes 14 journalled for rotation within the frames 10 and 12.

A center frame rock tube 15 is journalled within bearings 16 and may be rotated by hydraulics in the usual way and illustrated schematically by reference character 15A in FIG. 4.

Wing frame rock tubes 16 are also journalled within the wing frames 12 substantially in alignment with the center frame rock tube 15 and these wing frame tubes are also journalled in corresponding bearings 16A mounted upon the frames 12.

Ground engaging wheels 17 support the center section and outboard wheels 18 support the wing sections when in the lowermost or cultivating position.

Link connections 19 shown schematically in FIG. 4 extend between the rock tubes 15 and 16 and the subsidiary rock tubes 14 so that rotation of tubes 15 and 16 will cause corresponding rotation of tubes 14 thus raising and lowering the cultivating elements 20 secured to these tubes and shown schematically in FIG. 4.

The connection between the center frame rock tube 15 and the wing frame rock tubes 16 is identified by reference character 21 and shown in detail in the remainder of the drawings.

The center frame rock tube 15 is provided with an offset crank 22 upon the outer end thereof outboard of the support bearing 16 and this crank 22 is provided with a sleeve 23 on the end thereof through which a nut and bolt assembly 24 engages, the bolt 24 being movable inwardly and outwardly in the sleeve and locked in position by means of the nut thereon. This gives adjustment for the engagement of this crank with a further crank 25 offset from the inner end of the wing frame rock tube 16. This crank 25 is provided with a base portion or flange 26 and an end portion 27 thus forming a pocket engageable by the bolt head of the nut and bolt assembly 24.

It will therefore be appreciated that rotation of the center frame rock tube 15 in the direction of arrow 28 will cause the bolt 24 to engage within the pocket on the crank 25 thus causing the wing frame rock tube to rotate in a similar direction and by a similar amount thus rotating the subsidiary rock tubes 14 by means of the links 19. Rotation of the center frame rock tube 15 in either direction will adjust the relationship of the cultivating elements 20 attached to the various rock tubes.

When it is desired to transport the implement, reference to FIG. 2 will show a pivot bolt 29 securing together lugs 30 and 31 extending from the frames 10 and 12 adjacent the connections 21.

The wing frames are merely moved upwardly to a position at right angles to the horizontal thus moving the pocket within the crank 25 out of engagement with the crank 22.

By the same token when the wing frames are lowered to the horizontal or cultivating position, the end of crank 22 is automatically engaged by the pocket formed on the end of crank 25 so that rotation of the rock tubes is assured.

I provide a hydraulic piston and cylinder assembly 32 extending between the frame 10 and a lug 33 offset from the frame 12 as clearly shown in FIG. 2. When in the transport position it is not desirable that the load be taken upon the piston and cylinder assembly 32 so that I provide a link 34 having an elongated slot 35 which in turn is engaged by a pin 33' on the end of lug 33. A movable link 36 is connected by one end to the support 37 upon which is mounted the piston and cylinder assembly 32 on the main frame 10 and is connected to the other end of the link 34 by means of pins 38 held in place by cotter pin 39.

Once the wing frames have been raised to the vertical position, link 36 is placed into position and held there by means of pins 38 and cotter pin 39 whereupon the hydraulic pressure may be released from the piston and cylinder assembly 32.

Various modifications can be made within the scope of the inventive concept which is herein disclosed and/or claimed. Accordingly, it is intended that what is set forth should be regarded as illustrative of such concept and not for the purpose of limiting protection to any particular embodiment thereof, and that only such limitations should be placed upon the scope of protection to which the inventor hereof is entitled as justice dictates.

What I claim as my invention is:

1. In a harrow assembly which includes a center frame section and a wing frame section hingedly secured to each end of the center frame section for movement between an extended harrowing position and a vertically folded transport position, relative to ground engaging support means or the like, a center frame rock tube journalled for rotation within said center frame section, a wing frame rock tube journalled for rotation in each wing frame section and in alignment with said center frame rock tube when in the harrowing position, means to rotate said center frame rock tube for raising and lowering harrowing components operatively connected to said rock tubes; the improvement which is characterized by means operatively connecting said wing frame rock tubes with said center frame rock tube whereby rotation of said center frame rock tube initiates similar rotation of said wing frame rock tubes, said last mentioned means including a crank and pocket assembly between said rock tubes, said assembly permitting free vertical folding of said wing frame sections relative to said center frame section, said crank and pocket assembly including an offset crank arm secured to each end of the rock tube of said center frame section and a corresponding offset crank arm on the adjacent end of each of said wing frame rock tubes, said offset crank arm on said wing frame rock tube including a base portion and an end portion extending perpendicular from said crank arm thus defining a pocket into which the corresponding crank arm ends of said center rock tubes may freely engage, said offset crank arm on said center section rock tube including a threaded sleeve secured thereto and an adjustable nut and bolt assembly extending therethrough.

* * * * *